Sept. 7, 1965         E. D. HAUK         3,204,991
QUICK-CONNECT JOINT OR COUPLING
Filed Nov. 7, 1963                    2 Sheets-Sheet 1
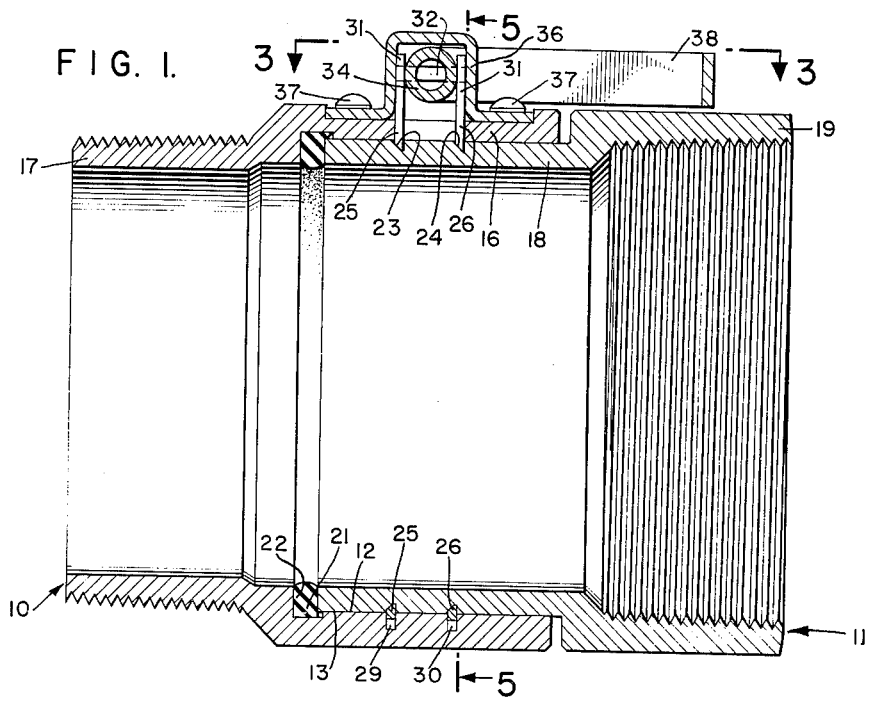
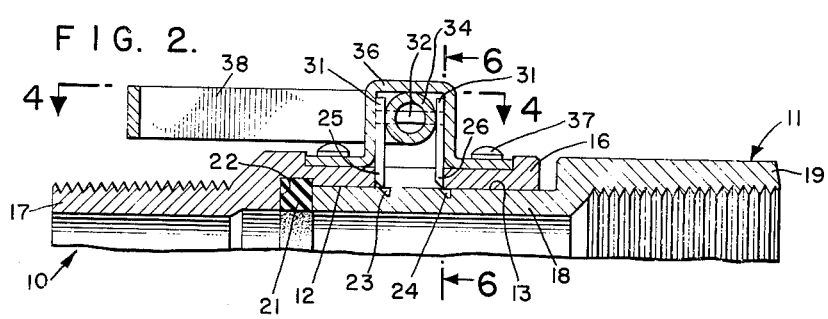
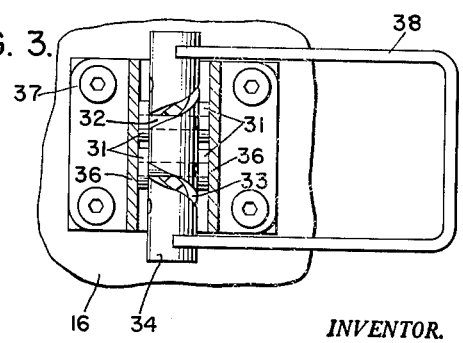
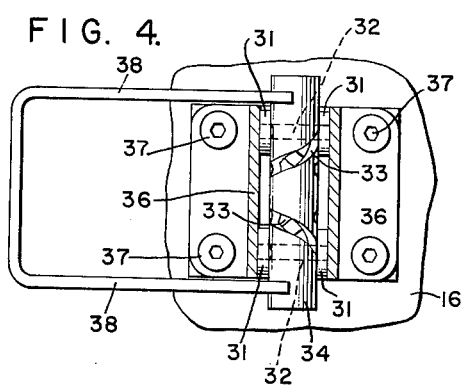
INVENTOR.
ERNEST D. HAUK
BY
ATTORNEY Sept. 7, 1965  E. D. HAUK  3,204,991
QUICK-CONNECT JOINT OR COUPLING
Filed Nov. 7, 1963  2 Sheets-Sheet 2
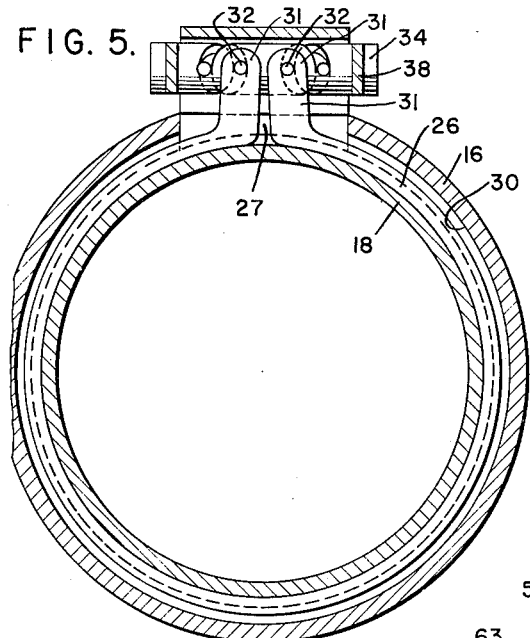
FIG. 5.
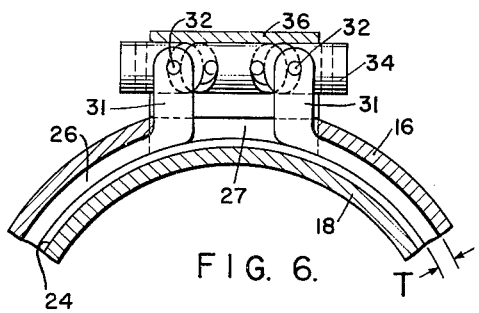
FIG. 6.
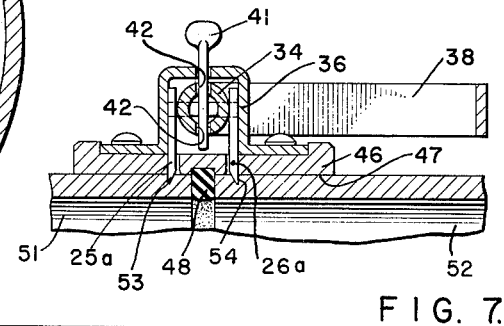
FIG. 7.
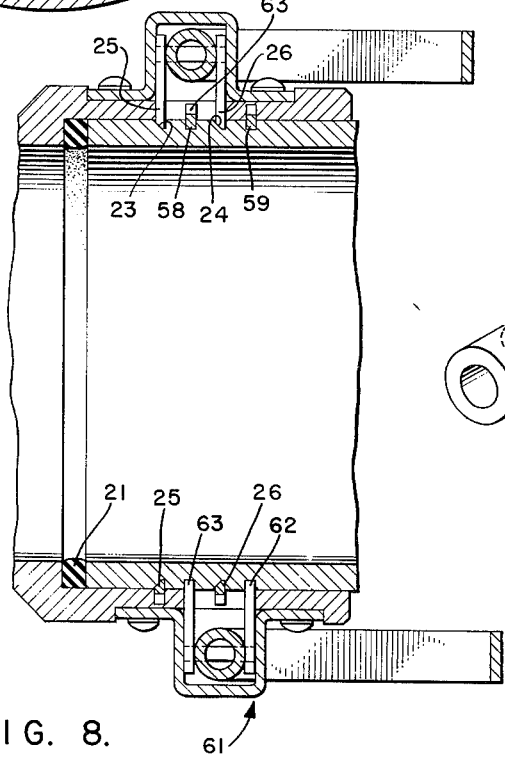
FIG. 8.
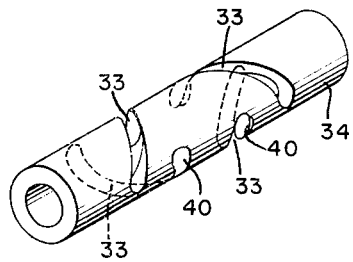
FIG. 9.
INVENTOR.
ERNEST D. HAUK
BY 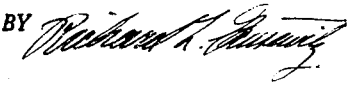
ATTORNEY

United States Patent Office 3,204,991
Patented Sept. 7, 1965

1

3,204,991
QUICK-CONNECT JOINT OR COUPLING
Ernest D. Hauk, 1315 E. 23rd St., Signal Hill, Calif.
Filed Nov. 7, 1963, Ser. No. 322,570
4 Claims. (Cl. 285—312)

The present application is a continuation-in-part of my co-pending patent application Serial No. 68,901, filed November 14, 1960, for a Quick-Connect Joint or Coupling, and now abandoned. This invention relates to a quick-coupling or joint apparatus.

An object of the invention is to provide a joint or coupling apparatus adapted rapidly to effect a strong and sealed connection between two sections of a pipe of conduit.

Another object is to provide a quick-connect sealed coupling incorporating at least two split annular springs and also incorporating a single actuating means which is connected to the free ends of both of said springs, whereby the diameters of both springs may be simultaneously and easily changed in order to achieve various types of coupling and sealing actions.

A further object is to provide a simple, quick-acting means for bringing into butt relationship the ends of a pair of tubular elements, characterized by the fact that a highly effective seal is formed between the ends of such elements.

Another object is to provide an improved quick-connect coupling which may be either normally open or normally closed.

Another object is to provide a simple and economical coupling apparatus which is rapidly and easily operable to effect a coupling adapted to resist very high working pressures, and to effect positive gasket compression whereby effective sealing is accomplished.

Another object is to provide a quick-connect coupling incorporating at least two annular spring elements and also incorporating a highly simple and effective cam apparatus for rapidly effecting changes in the diameters of such spring elements.

Another object is to provide a quick-coupling apparatus incorporating positive means to lock the same in closed condition.

These and other objects will become apparent from the following detailed description taken in connection with the accompanying drawings in which:

FIGURE 1 is a longitudinal central sectional view illustrating a quick-coupling apparatus constructed in accordance with the present invention, in closed or locked condition;

FIGURE 2 is a fragmentary longitudinal sectional view corresponding to the upper part of FIGURE 1 but illustrating the apparatus in open or unlocked condition;

FIGURE 3 is a section on line 3—3 of FIGURE 1, showing the apparatus in closed condition;

FIGURE 4 is a sectional view taken on line 4—4 of FIGURE 2 and showing the apparatus in open condition;

FIGURE 5 is a transverse sectional view on line 5—5 of FIGURE 1, the apparatus being illustrated in closed condition;

FIGURE 6 is a fragmentary transverse section corresponding to the upper portion of FIGURE 5 and illustrating the apparatus in open condition, such section being taken on line 6—6 of FIGURE 2;

FIGURE 7 is a fragmentary longitudinal sectional view illustrating a second embodiment of the invention, in which means are provided to create a sealed butt joint between two tubular elements or members;

FIGURE 8 is a longitudinal central sectional view illustrating a third embodiment of the invention, in which auxiliary means are provided to effect an additional locking connection so that the ability of the apparatus to withstand extremely high fluid pressures is enhanced; and FIGURE 9 is a perspective view of the tubular cam member.

Referring first to the embodiment of FIGURES 1-6, inclusive, the apparatus is illustrated to comprise a female member 10 and a male member 11, the latter being adapted to telescope into at least a portion of the female member in such manner that corresponding surfaces 12 and 13 of the female and male members are radially adjacent each other. In the illustrated embodiment, the corresponding surfaces 12 and 13 are cylindrical and differ only slightly in diameter. It is to be understood, however, that such corresponding surfaces may be somewhat tapered.

The illustrated female member 10 comprises a strong cylindrical metal element 16 having a smaller-diameter externally-threaded male extension 17. The illustrated male member 11 comprises a strong cylindrical metal element 18 adapted to telescope into element 16, so that the surfaces 12 and 13 are radially adjacent as indicated above. Element 18 has an internally-threaded female extension 19. Extensions 17 and 19 are adapted to be connected into a string of pipe in conventional manner.

Gasket means 21 is mounted in the female element 10 to effect a seal with at least one male element 11. The illustrated gasket means comprises an O-ring or the like and is seated against a shoulder 22 which is formed in the female member at the junction between its portions 16 and 17. The shoulder and gasket means have such diameters that the gasket is abutted by the inner end of portion 18 of male member 11 when the coupling is in locked condition.

First and second continuous external annular grooves 23 and 24 are formed in surface 13 of element 18 and in spaced planes perpendicular to the axis of the apparatus. Grooves 23 and 24 are respectively adapted to receive the inner portions of corresponding cam and lock rings 25 and 26. Each such ring is continuous about the entire periphery of male element 18 except for a single split or gap 27 (FIGURES 5 and 6). The rings 25 and 26 each have corresponding parallel surfaces which lie in planes perpendicular to the axis of the apparatus.

Rings 25 and 26 are respectively disposed in internal annular grooves 29 and 30 formed in portion 16 of female member 10. Such grooves have walls lying in planes perpendicular to the axis of the apparatus, and are adapted to receive the surfaces or faces of the rings in close-fitting but movable relationship. The depths of the internal grooves 29 and 30 are such that the extreme inner edges of the rings will be recessed slightly below (outwardly) from surface 12 when the rings are in their maximum-diameter positions, illustrated in FIGURE 6, that is to say when the split or gap 27 is of maximum size. When, on the other hand, the split or gap 27 is of minimum size, FIGURE 5, the diameters of the rings 25 and 26 are reduced until the inner edges of the rings seat closely in annular grooves 23 and 24 to effect a locking function preventing axial movement of the male member.

Each ring 25 and 26 is formed of a strong hard spring metal, such as spring steel. Each ring, or annular spring, has a free or natural diameter at least equal to that shown in FIGURE 6 (gap 27 maximum). Accordingly, the natural tendency of each ring is to be fully seated in internal groove 29 or 30, so that there is no interference with axial shifting of the member 11 into or out of member 10. When thus seated in a groove 29 or 30, each spring operates as a bias means to maintain in opening or unlocking condition the cam means to be described subsequently.

It is important that each split ring or spring 25 and 26 be round, and free of permanent deflection points or bends, throughout its full circumference. To accomplish this result, particularly on smaller-diameter couplings having diameters on the order of four inches and less, the radial dimension T (FIGURE 6) of each spring should be approximately equal to or less than the square root of the product obtained by multiplying the outer diameter of the spring by 0.005.

It is a feature of the invention that the inner edges of rings or springs 25 and 26, and the corresponding walls of grooves 23 and 24 in the male member, are correspondingly beveled in such manner that reduction of the diameters of the rings causes the male member to be cammed inwardly (to the left) and thereby compress gasket 21 to sealing condition. After initial telescoping of the male member to the position shown in FIGURE 2, the radial surfaces of rings 25 and 26 which are relatively adjacent extension 19 are located radially-outwardly of the beveled wall portions of grooves 23 and 24, such wall portions being relatively adjacent gasket 21. Subsequent reduction the sizes of gaps 27, to reduce the diameters of the rings until the FIGURE 1 condition is reached, progressively forces the inner edges of the rings into grooves 23 and 24. This effects axial shifting of the male member to the position shown in FIGURE 1, at which gasket 21 is compressed against shoulder 22. To release the male member it is merely necessary to permit the sizes of gaps 27 to increase as the result of the spring action of rings 25 and 26. Such rings or springs then seat themselves roundly and uniformly in grooves 29 and 30.

There will next be described the cam apparatus for alternately decreasing the sizes of gaps 27 and permitting the sizes of such gaps to increase, and also the means for locking the cam means in its position assumed when the gap sizes are minimum. Such apparatus comprises ears or lugs 31 formed integrally on each end of each ring 25 and 26, adjacent gap 27, such ears extending radially-outwardly in the same planes as the rings with which they are integral. In order to permit such outward extension of the ears, a gap or opening is formed in portion 16 of the female member 10. Such opening is of sufficient length, arcuately or circumferentially of the apparatus, to permit separation of the ears to the positions shown in FIGURE 6.

The outer portions of the respective ears 31 are provided with openings through which strong hardened metal pins 32 are extended, such pins being disposed parallel to the axis of the apparatus. Each of the pins, there being one pin on each side of gap 27, has its end portions disposed in cam slots 33 (FIGURE 9) which are cut in a tubular cam member 34.

Two sets of cam slots are formed in cam member 34, one set for each of the two pins 32. Each such set comprises two slots formed in X-relationship on opposite sides of the tube. Stated otherwise, each set comprises two slots each of which extends both axially and circumferentially of the tube, the slots being provided on opposite sides of the tube. The ends of the slots are disposed generally in a plane containing the axis of the tube.

In order to maintain each pin 32 in its position through both of the cam slots in each set thereof, and through the ears 31 on opposite sides of the cam tube 34, an inverted channel-shaped member 36 is rigidly mounted on female portion 16 by means of screws 37. The sides of member 36 lie in planes perpendicular to the axis of the apparatus, and the inner surfaces of such sides are disposed closely adjacent the ears or lugs 31 as shown in FIGURES 1 and 2. The channel member 36 performs the additional function of preventing the cam elements from being injured in the event of contact of the apparatus with an obstacle.

A U-shaped handle or crank 38 is suitably welded or otherwise secured to the end portions of cam tube 34, adjacent opposite ends of channel 36, to permit manual rotation of the cam tube. The connection between crank 38 and cam tube 34 is such that when the crank is in the position of FIGURE 1 the pins 32 are located in the ends of slots 33 (in each X-shaped set thereof) which are relatively adjacent the center portion of the tube. It follows that the ears 31 are then pulled together, against the bias or resistance presented by the spring rings 25 and 26, and that gaps 27 are minimized to cause the connected rings 25 and 26 to be in small-diameter locking condition.

Upon turning of the handle or crank 38 one-hundred eighty degrees to the position of FIGURE 2, the pin ends are disposed in the slot portions relatively adjacent the ends of cam tube 34, so that ears 31 are permitted to spread apart. Rings 25 and 26 are then in maximum-diameter condition and are fully recessed into annular grooves 29 and 30. The spring action of rings 25 and 26 causes such rings to remain circular, and enhances the described recessing operation.

In both its locking and release positions, the handle or crank 38 is disposed closely adjacent the apparatus and parallel to the axis thereof, so that a minimum of space is occupied. The springs 25 and 26 operate, as indicated above, to urge handle 38 toward its release position.

It is an important feature of the invention that the rings 25 and 26, when in small-diameter locking position, are under extreme tension. Such tension is distributed uniformly about the entire circumference of the apparatus to maintain the rings seated closely in all portions of grooves 23 and 24 except at gaps 27.

The ring tension is so great that, despite the friction present, rotation of cam tube 34 may occur unless means are provided to prevent the same. Such means include semi-cylindrical recesses 40 (FIGURE 9) formed near the center portion of cam 34 at the adjacent ends of cam slots 33. Recesses 40 are adapted to receive the end portions of pins 32 in such manner that the pins bear against substantially 180 degrees of the recess walls. The recesses thus provide a detent action tending to prevent rotation of cam tube 34 unless handle 38 is intentionally turned. Additionally, such recesses greatly increase the bearing area between the pins and the cam tube, as is desirable because of the extremely high tensile forces which are present.

An additional means to prevent undesired rotation of handle 38 is illustrated in FIGURE 7. Such lock means comprises a lock pin 41 which extends through an opening in the web of channel-shaped housing 36 and through corresponding holes 42 in diametrically-opposed wall portions of the cam tube. It is to be understood that the lock pin 41 may be provided for the cam mechanism in all embodiments of the invention.

*Brief summary of operation—embodiment of FIGURES 1–6*

Let it be assumed that handle 38 is in the position shown in FIGURE 2, so that the ears 31 on opposite sides of gap 27 are permitted to spread apart to the position of FIGURE 6. The rings are then expanded or recessed radially outwardly into the internal annular grooves 29 and 30 in the female member, so that they will not interfere with telescoping of the male member therein. Because of the spring action of the rings, it is assured that they will recess properly, and remain round.

Portion 18 is then inserted to the position shown in FIGURE 2, the inner end thereof being in abutment with gasket 21 which serves as a stop. It is then merely necessary to manually rotate the handle 38 through a 180-degree angle to the position of FIGURE 1. The resulting rotation of cam tube 34 causes extreme tension to be applied to the ears 31 on opposite sides of gap 27, thereby pulling the ears towards each other to the position of FIGURE 5. Such tension is transmitted to the rings 25 and 26 and reduces the diameters thereof until the FIGURE 5 position is achieved. Stated otherwise, the uniformly-distributed hoop tension forces or pulls the inner edge portions of rings 25 and 26 into grooves 23 and 24. The resulting cam action with the groove walls causes male member 18 to be shifted axially to the position in FIGURE 1, at which the gasket 21 is compressed to effect the seal. The presence of the rings in the grooves 23 and 24 effectively prevents axial shifting of the male member, despite the presence of high fluid pressures, so that a firm lock or joint is achieved.

*Embodiment of FIGURES 1–6, but with spring rings 25 and 26 which are normally small in diameter*

The spring rings 25 and 26 may be normally closed (small in diameter) instead of open as described above. Stated otherwise, the rings 25 and 26 are so constructed that when in their free conditions they are relatively small in diameter as shown in FIGURE 5, the gaps 27 being of minimum size.

With such a construction, the handle 38 must be manually held in the position shown in FIGURE 2 during insertion of male portion 18 into portion 16. Otherwise, ring 26 would block passage of the inner end of portion 18.

As soon as portion 18 has been inserted past both rings, handle 38 is released. The rings 25 and 26 then, in attempting to assume their normal small-diameter conditions, bear against surface 13 of the male member.

When the parts are in the longitudinal positions shown in FIGURE 2, the rings automatically become somewhat smaller in diameter, due to partial movement thereof into grooves 23 and 24, which causes a partial clockwise rotation of handle 38. The operator is thus signaled that the components are in proper position for additional manual rotation of handle 38, to the closed position of FIGURE 1.

In summary, the construction of rings 25 and 26 as normally small-diameter elements makes it somewhat less convenient to insert the male portion initially, but more simple to ascertain when the parts are in the longitudinal positions at which locking may be achieved.

*Embodiment of FIGURE 7*

In the embodiment of FIGURE 7, the female member is indicated at 46 as comprising a short metal tube having an interior cylindrical surface 47. A gasket 48 is fixedly mounted (at its peripheral edge) in the female member 46 and extends radially-inwardly into the passage therethrough. Mounted in interior grooves in the female member 46 are two split rings 25a and 26a, such rings being similar to those described in connection with the embodiment of FIGURES 1–6 except that the bevel of ring 25a is reversed so that it faces the bevel of ring 26a. The bevel angles of rings 25a and 26a may be the same as in the previous embodiment. They may also be relatively small, for example about 23 degrees from radial planes containing the rings.

Rings 25a and 26a are associated with a locking mechanism which is identical to that described in connection with the embodiment of FIGURES 1–6. However, a portion of the body of female member 46, between the rings 25a and 26a and at the gap between the ears, is maintained in order to provide a back-up for the gasket 48. Such portion, and the entire inner surface 47 of the female member, is annularly grooved to receive the gasket 48.

After turning of the handle 38 to the position at which rings 25a and 26a are recessed into female member 46, two corresponding male members 51 and 52 are telescoped into the female member through opposite ends thereof. Such male members have annular grooves 53 and 54 which are so located that they are adjacent rings 25a and 26a when the inner ends of the male members are in abutment with gasket 48. Such grooves have walls which are beveled correspondingly to those of the respective rings 25a and 26a.

With the described construction, rotation of handle 38 to the position shown in FIGURE 7 causes reduction in the diameters of rings 25a and 26a to force them into grooves 53 and 54. The resulting cam action is such as to cause the male members 51 and 52 to move toward each other and compress gasket 48 as is desired. The degree of gasket compression may be sufficient even when the bevel angles are made much smaller than in other embodiments. Also, the small bevel angles create a wedge relationship which prevents the rings from being cammed out of the grooves despite very high fluid pressures.

The rings 25a and 26a may be made either normally open or normally closed, as described relative to FIGURES 1–6.

*Embodiment of FIGURE 8*

The embodiment of FIGURE 8 is identical to that of FIGURES 1–6, except as will be specifically stated.

In the embodiment of FIGURE 8, the male member is formed not only with the grooves 23 and 24 which are beveled as previously stated, but also with grooves 58 and 59 disposed in alternation with grooves 23 and 24. The grooves 58 and 59 correspond to grooves 23 and 24 except that both side walls of each of the grooves 58 and 59 lie in planes perpendicular to the axis of the apparatus, there being no bevels.

A cam mechanism 61 is mounted on the female member and is connected with rings 62 and 63 which are identical to rings 25 and 26 except that both faces of each of the rings 62 and 63 are perpendicular to the axis of the apparatus (not beveled) so as to be received closely in the grooves 58 and 59. Cam mechanism 61, and the cam mechanism associated with the beveled rings 25 and 26, are each identical to the cam mechanism described in connection with the embodiment of FIGURES 1–6.

In the operation of the embodiment of FIGURE 8, the cam mechanism associated with rings 25 and 26 is first operated to effect compression of the gasket 21 and to bring the rings 62 and 63 into perfect registry with grooves 58 and 59. Thereafter, the cam mechanism 61 may be operated to effect insertion of the rings 62 and 63 into the grooves 58 and 59. It is pointed out that cam mechanism 61 may not be operated until after operation of the cam mechanism for rings 25 and 26.

Since the rings 62 and 63, and the corresponding walls of grooves 58 and 59, are perfectly radial instead of being beveled, there is no cam action created such as could force the rings out of the grooves therefor. Accordingly, the male and female elements may not be separated unless the rings 62 and 63 are actually sheared.

*Additional discussion of various critical elements and relationships, relative to all embodiments of the invention*

The use of the plurality of split spring rings 25 and 26, together with an actuating means connected to both of such rings to effect simultaneous and cooperative operation thereof, is essential to the invention. It is emphasized that the rings 25 and 26, and their associated grooves, correspond to each other in size and other characteristics. It is also emphasized that the ends of ring 25 are directly connected, by means of pins 32, to the corresponding ends of ring 26. Such pins, while riding in the cam slots 33 therefor, have a certain amount of play or freedom.

Because of the factors stated in the preceding paragraph, shifting of handle 38 from the open position (FIGURE 2) to the closed position (FIGURE 1) not only tensions rings 25 and 26 simultaneously, but also maintains the tension in ring 25 substantially equal to the tension in ring 26. The invention therefore affords a simple and effective means of applying uniform pressures around substantially the full circumferences of both of the cam surfaces in grooves 23 and 24. Such a system may be termed a "force-equalizing actuator means."

Because the camming pressures exerted by the beveled surfaces of spring rings 25 and 26 against the correspondingly beveled walls of grooves 23 and 24 are uniform and circumferentially substantially continuous, a high resultant or total axial force is generated with very low unit pressures at the mating beveled surfaces. Stated otherwise, a high axial force (tending to compress gasket 21) is achieved with relatively few pounds per square inch pressures at any parts of the interfaces between the engaged beveled surfaces.

The low unit pressures at the interfaces reduce frictional forces, greatly minimize galling (gouging) and wear, and accomplish other benefits important to the successful operation of the apparatus. Thus, it is a simple matter—requiring very little force and creating almost no wear and galling—to pivot the handle 38 between open and closed positions.

It might be supposed that the above-stated results could be achieved with a single ring, but this is not possible. If both elements 25 and 26 were but part of a single large ring, whether integral or rigidly connected circumferentially therearound, the loads around cam grooves 23 and 24 would not be uniformly distributed. If there were only a single ring with a single cam surface, no variation in the size of such surface could reduce the unit pressures substantially, it being pointed out that the entire ring must necessarily be disposed radially-outwardly of the groove during telescoping of the associated tubular elements. Thus, the use of separate but interconnected rings is of the essence.

It might also be supposed that separate actuating means could be provided for the rings 25 and 26, but this also would be incorrect. Let it be assumed, for example, that a turnbuckle is connected between the ends of ring 25, and a separate turnbuckle is connected between the ends of ring 26. Even if such turnbuckles are operated simultaneously and at the same speed, there is no practical way of maintaining the tensions in the rings substantially equal. Variations in the threads of the turnbuckles, or variations in other factors, may create widely different ring tensions even if the rotating parts of the turnbuckles are mechanically associated. Furthermore, turnbuckles are very slow-operating, and impractical, compared to the quick acting means of the present invention.

The simultaneous operation of both rings is essential to the success of the embodiment of FIGURE 7. Let it be assumed, for example, that ring 25a is closed independently of ring 26a (which remains open). Such closing of ring 25a would shift gasket 48, and thus tube 52, to the right. Groove 54 would then be out of registry with ring 26a, so that the latter could not be closed. Such a device would be unworkable.

The use of two rings 25 and 26 makes it practical to employ the present quick-acting cam mechanism 34, 38, etc., having a simple and symmetrical construction, and characterized by balanced forces. The great simplicity and ruggedness of the present combination cannot be overemphasized. To assemble the cam means, it is merely necessary to insert pins 32 through ears 31 and through the cam slots 33, and then mount the channel element 36 (which serves also as a protective housing).

In summary, therefore, it is emphasized that (in all embodiments) the association of two spring rings with the tubular cam mechanism produces a balanced and uniform set of forces, in a simple and strong mechanism, which makes the coupling apparatus highly effective and efficient in operation.

For some types of uses, a single turnbuckle may be substituted for cam tube 34, the nut portions of the turnbuckle being trunnioned in the openings in ears 31. Such turnbuckle arrangement is, however, much slower-operating and otherwise less satisfactory than is the present cam mechanism. In all instances, the actuating device is disposed between the two rings 25 and 26 at the ear (gap) portions thereof.

The foregoing detailed description is to be clearly understood as given by way of illustration and example only, the spirit and scope of this invention being limited solely by the appended claims.

I claim:
1. A high-pressure quick-connect and quick-disconnect joint or coupling, which comprises
   a tubular female member having an internal wall portion which is generally circular and coaxial with the axis of said female member,
      said internal wall portion having at least two annular grooves formed therein in parallel relationship,
   a tubular male member having an external wall portion which is generally circular and coaxial with the axis of said female member,
      said external wall portion of said male member being radially adjacent said internal wall portion of said female member when said male member is inserted in said female member,
      said external wall portion having at least two annular grooves formed therein in corresponding relationship to said grooves in said female member,
   at least two metal rings each of which is continuous except for a single peripheral gap therein,
      said gaps being adjacent each other,
      said rings being disposed in said annular grooves in said internal wall portion of said female member and having end portions disposed on opposite sides of said gaps,
      said gaps being sufficiently large that pulling of said end portions of each ring towards each other effects sufficient reduction in the diameters of said rings to cause the innermost portions thereof to enter said annular grooves in said external wall portion of said male member,
      said annular grooves in said internal wall portion of said female member being sufficiently deep that spreading of said end portions of said rings apart will cause said rings to enter said annular grooves in said female member and thereby free said male member for axial movement in said female member,
      said annular grooves in said male and female members being sufficiently narrow that the surfaces of said rings are adjacent the walls of said grooves whereby to prevent substantial axial movement of said male member in said female member,
   a cam tube mounted between said two rings at said gaps and formed at each end portion thereof with two cam slots disposed in X-relationship relative to each other on opposite sides of said cam tube,
   pin means provided at the ends of said two rings on one side of said gaps and penetrating both X-related cam slots at one end portion of said cam tube,
   second pin means provided at the ends of said two rings on the other side of said gaps and penetrating both X-related cam slots at the other end portion of said cam tube, and means to rotate said cam tube about the axis thereof and through an angle sufficient to effect said pulling and spreading of said end portions of said rings.

2. The invention as claimed in claim 1, in which said pin means comprise substantially parallel pins each extending through the ends of said rings on one side of said gaps, and in which a housing is fixedly mounted on said female member over said cam tube and also over the end portions of said rings, said housing having wall portions sufficiently close to said ring end portions and cam tube to prevent shifting of said pins out of mounted positions therein.

3. The invention as claimed in claim 1, in which said rings and the corresponding annular grooves in said male member have cooperating cam surfaces shaped to effect axial shifting of said male member in said female member in response to reduction in the diameters of said rings, and in which gasket means are provided in said female member for compression by said male member in response to said axial shifting.

4. The invention as claimed in claim 3, in which said cam surfaces comprise continuous bevels.

References Cited by the Examiner

UNITED STATES PATENTS

| | | | |
|---|---|---|---|
| 763,837 | 6/04 | Bailey | 285—314 |
| 1,261,687 | 4/18 | Brandon | 285—312 |
| 1,919,001 | 7/33 | White | 285—321 |
| 2,595,787 | 5/52 | Heimann | 285—321 |
| 2,805,089 | 9/57 | Hansen | 285—317 |
| 2,877,732 | 3/59 | Eaton | 285—121 |
| 2,901,269 | 8/59 | Rickard | 285—308 |
| 2,962,096 | 11/60 | Knox | 285—315 |
| 3,100,121 | 8/63 | Hillmer | 285—321 |

FOREIGN PATENTS 570,671   7/45   Great Britain.

CARL W. TOMLIN, *Primary Examiner.*